United States Patent [19]
Korevaar

[11] Patent Number: 6,118,131
[45] Date of Patent: Sep. 12, 2000

[54] DIRECTIONAL OPTICS FOR A SYSTEM FOR DIRECTING A LASER BEAM TOWARD AN ACTIVE AREA

[75] Inventor: Eric J. Korevaar, San Diego, Calif.

[73] Assignee: Astro Terra Corporation, San Diego, Calif.

[21] Appl. No.: 09/109,315

[22] Filed: Jul. 1, 1998

Related U.S. Application Data

[63] Continuation-in-part of application No. 09/075,602, May 11, 1998.

[51] Int. Cl.$^7$ ........................................... H04B 10/00
[52] U.S. Cl. ........................................ 250/559.3; 359/159
[58] Field of Search ..................... 250/559.3; 359/143, 359/152, 159, 172

[56] References Cited

U.S. PATENT DOCUMENTS

| | | |
|---|---|---|
| 3,488,586 | 1/1970 | Watrous et al. . |
| 3,794,841 | 2/1974 | Cosentino et al. . |
| 5,367,398 | 11/1994 | Ito et al. ............................. 359/154 |
| 5,416,627 | 5/1995 | Wilmoth . |
| 5,526,161 | 6/1996 | Suzuki et al. . |
| 5,777,768 | 7/1998 | Korevaar . |

OTHER PUBLICATIONS

W.M. Bruno, R. Mangual, and R.F. Zampolin, *Diode Laser Spatial Diversity Transmitter*, pp. 187–194, SPIE vol. 1044 Optomechanical Design of Laser Transmitters and Receivers, (1989).

E. Korevaar et al., *Status of SDIO/IS&T Lasercom Testbed Program*, pp. 116–127, SPIE vol,. 1866, Jan. 1993.

E. Korevaar et al., *Status of BMDO/IST Lasercom Advanced Technology Demonstation*, pp. 96–107, SPIE vol. 2123, Jun. 1994.

E. Korevaar et al., *Design of Satellite Terminal for BMDO Lasercom Technology Demonstration*, pp. 60–71, SPIE vol. 2381, Sep. 1995.

J. Schuster et al., *Optomechanical Design of STRV–2 Lasercom Transceiver Using Novel Azimuth/Slant Gimbal*, pp. 227–239, SPIE vol. 2699, Jan. 1996.

K.E. Wilson et al., *Preliminary Results of the Ground/ Orbiter Lasercomm Demonstation Experiment between Table Mountain and the ETS–VI Satellite*, pp. 121–132, SPIE vol. 2699, May 1996.

TERRALINK™ Laser Communications Systems Brochure, including TERRALINK–155™ Transceiver Specifications. Brochure produced by AstroTerra Corporation.

AstroTerra Corporation brochure entitled *Wireless Communication Solutions*, including specifications on the TERRALINK™ series.

*Primary Examiner*—Stephone B. Allen
*Attorney, Agent, or Firm*—Nydegger & Associates

[57] ABSTRACT

A device and method for aligning the focal point of a laser beam into coincidence with the active area of a detector includes an optical element for focusing the laser beam to the focal point at a location on the surface of the detector. Also included is a selectively activated light source and a camera which establishes a reference location for the active area within an x-y grid coordinate system whenever the surface of the detector is illuminated by the light source. Further, by using the light that is reflected from the focal point location through a beam splitter, the camera also establishes the location of the laser beam focal point in the same coordinate system. The optical element is then adjusted to move the focal point in the x and y directions, as required, to thereby bring the focal point location into coincidence with the active area. When an optical system, such as a reflector telescope, is used to establish a partially obscured in-coming beam, a lens and prism can be positioned in the obscuration to collect and focus light scattered from the focal point at the detector and direct it toward the camera for alignment purposes.

19 Claims, 3 Drawing Sheets

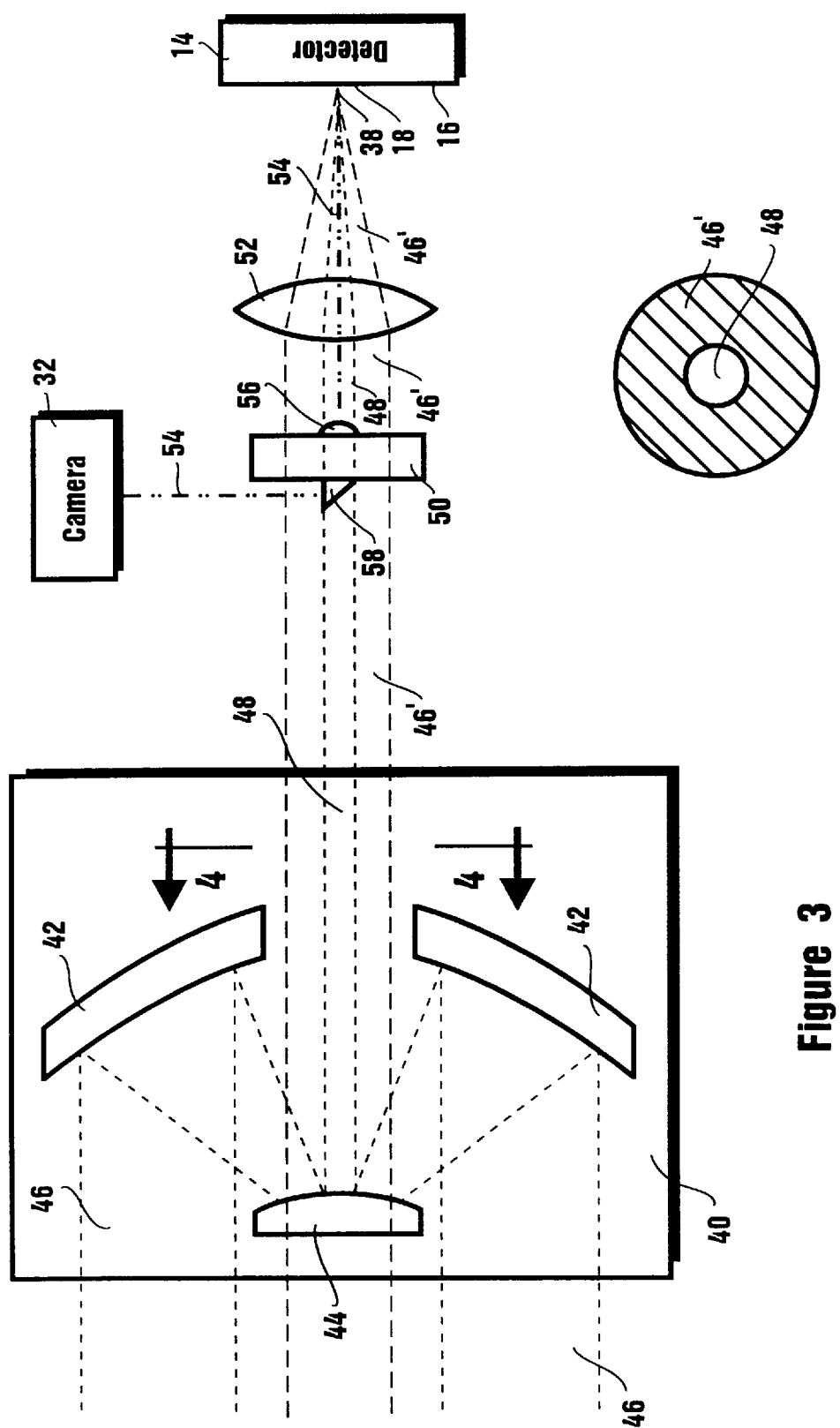

DIRECTIONAL OPTICS FOR A SYSTEM FOR DIRECTING A LASER BEAM TOWARD AN ACTIVE AREA

This application is a continuation-in-part of application Ser. No. 09/075,602, filed May 11, 1998, which is currently pending. The contents of application Ser. No. 09/075,602 are incorporated herein by reference.

FIELD OF THE INVENTION

The present invention pertains generally to communications links which use laser beams as the medium for transmitting signals on the link. More particularly, the present invention pertains to devices and methods which align optical components for accurately focusing the receiver of the laser beam communication link. The present invention is particularly, but not exclusively, useful for aligning optical components to focus a laser beam onto a diminutive active area in the detector of a laser beam receiver for the purpose of enhancing the signal carrying capacity of the communications link.

BACKGROUND OF THE INVENTION

The set-up of a laser communications link involves the proper alignment of numerous optical components. One of the more important and essential tasks which needs to be accomplished in the set-up of a laser communications link is the proper focus and alignment of the in-coming laser beam at the receiver. Specifically, it is essential for the laser beam to be properly aligned and focused onto the detector of the laser beam receiver. For several reasons this is not an easy task.

Typically, the detector of a laser beam receiver includes an avalanche photo diode (APD) which is capable of amplifying the incoming light so that the informational data which is being carried thereon can be easily retrieved and used. Of no small concern is the ability of the detector to handle the data that is carried on the laser beam. It happens that detectors with active areas (also referred to as apertures) which have diameters of approximately five hundred microns (500 $\mu$m) are capable of handling about four to five hundred Megabits per second (400–500 Mb/s). It is known, however, that smaller apertures are capable of handling even larger volumes of data. Specifically, it is known that detectors with active areas which are approximately one hundred and fifty microns in diameter (150 $\mu$m) are capable of handling laser beam data transmission that are somewhere between six hundred and twenty two Megabits per second and one and two tenths Gigabits per second (622 Mb/s–1.2 Gb/s). This increase is significant and cannot be ignored. With the use of a smaller aperture (active area), however, there is increased difficulty in establishing the focus of the laser beam on the aperture.

The nature of the problem involved in establishing and maintaining the focus of a laser beam on the aperture of a detector in a laser beam receiver is at least three-fold. First, the use of a very small aperture (i.e. 150 $\mu$m diameter) requires a very precise alignment of the laser beam focal point with the aperture. Second, due to the small scales that are involved, alignment adjustments of the laser beam's focal point is a sensitive operation which requires effective monitoring. Third, without specifically dedicated equipment, the compactness and confined space requirements of a laser beam receiver make direct visual references for the alignment of the laser beam focal point with the detector aperture virtually impossible.

In light of the above it is an object of the present invention to provide a laser beam receiver, and a method for aligning the optical components of such a receiver, which use light reflected out of the laser beam path to reference the detector aperture, and to establish the location of the laser beam focal point relative to the aperture. It is another object of the present invention to provide a laser beam receiver, and a method for aligning the optical components of such a receiver, which establish a common grid coordinate system for locating both the detector aperture and the focal point of the laser beam on the detector relative to the aperture. Still another object of the present invention is to provide a laser beam receiver, and a method for aligning the optical components of such a receiver, which allow for visually controlling the remote adjustment of optical components without removing or disrupting other components. Another object of the present invention is to provide a laser beam receiver, and a method for aligning the optical components of such a receiver, which use light collected from behind an obscuration in the beam to reference the detector aperture and to establish the laser beam focal point relative to the aperture. Yet another object of the present invention is to provide a laser beam receiver with properly aligned optical components which is simple to use, relatively easy to manufacture, and comparatively cost effective.

SUMMARY OF THE PREFERRED EMBODIMENTS

In accordance with the present invention, an optical alignment device for establishing the coincidence of a laser beam focal point with the active area of a detector in a laser beam receiver includes components and methods for: 1) referencing the location of the detector's active area; 2) detecting the location of the laser beam focal point on the detector, and; 3) moving the location of the laser beam focal point into coincidence with the location of the active area. To accomplish these tasks, several interactive elements must cooperate with each other.

In order to establish a reference location for the active area of the laser beam detector, the device of the present invention includes a light source, such as a Light Emitting Diode (LED). In its operation, this light source LED is selectively activated to illuminate the detector and, more specifically, it is used to illuminate a surface of the detector on which the active area (aperture) of the detector is located. An imaging Charged-Coupled Device (CCD)(i.e. a camera) is also positioned on the device of the present invention to view the detector surface whenever it is illuminated by the LED light source. Using the image of the detector surface that is obtained by the camera, and superposing this image onto an x-y grid coordinate system, the location of the active area is determined. The x-y coordinates of the active area are then subsequently used as a reference location. For purposes of the present invention, the x-y coordinate system can be dependent on pixel locations in the CCD.

In addition to the reference location for the detector's active area, the x-y grid coordinates of the location where the laser beam focal point is incident on the surface of the detector are also determined using the camera. Specifically, this is accomplished by viewing a portion of the light that is reflected, or scattered, from the laser beam focal point on the detector surface. A beam splitter which directs this reflected light from the laser beam path toward the camera allows the system operator to view the laser beam focal point on the detector surface without disrupting the laser beam optical focusing components. The camera (imaging CCD) then uses this reflected light to establish the location of the laser beam focal point.

For systems wherein the in-coming laser beam is defined by a device which includes components that obscure a portion of the laser beam, such as a telescope, the resultant obscuration can be used to advantage by the present invention. Typically, such an obscuration is created as a hole in the laser beam which is substantially coaxial or otherwise parallel to the beam's optical axis. Although light of the in-coming beam does not fill the hole (obscuration), light from the focal point on the detector will be reflected or scattered into the hole. This light that is scattered into the hole can then be collected and directed off-axis to the camera. The optical components which direct this light off-axis are typically positioned in the hole so that there is minimal disruption of the laser beam. For the present invention, these optical components include a lens which focuses the scattered light, and a prism which directs the focused light toward the camera.

By using the camera and grid coordinate system in the manner disclosed above the system operator is able to compare the reference location of the detector's active area (aperture) with the location of the laser beam focal point. Based on this comparison, the operator is then able to adjust the optical focusing element of the laser beam in order to bring the location of the laser beam focal point into coincidence with the active area of the detector.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a schematic of the optical components of an alternate embodiment of the present invention; and FIG. 4 is a cross-sectional view of the in-coming laser beam as seen along the line 4—4 in FIG. 3.

DESCRIPTION OF THE PREFERRED EMBODIMENT

Figure 1:
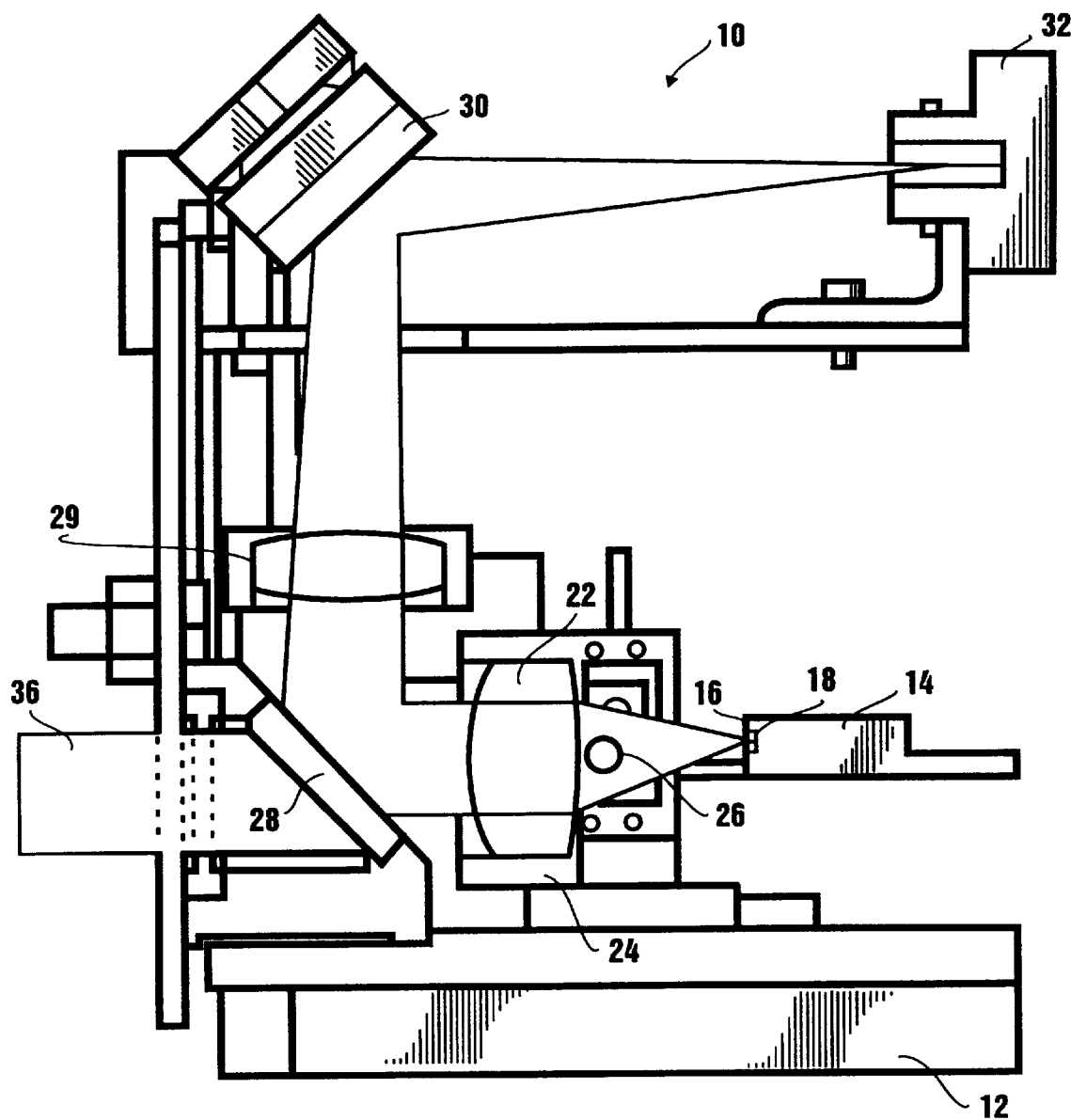
FIG. 1 is a schematic diagram of the components of the present invention shown in their general relationship to each other.
Figure 2A:
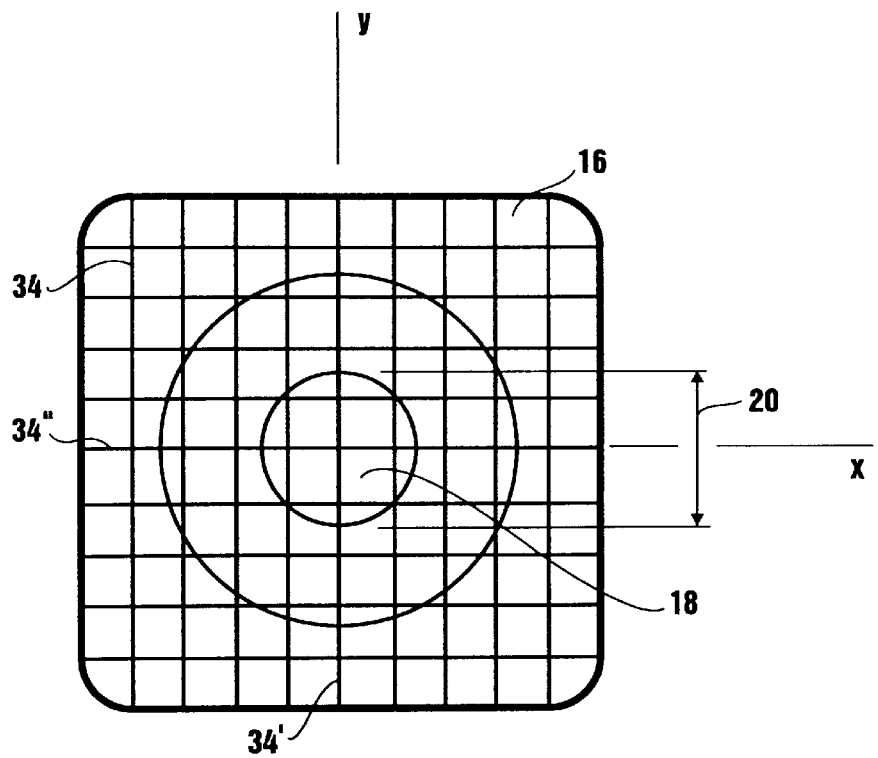
FIG. 2A is a representative image of the active area and surface of the detector with a superposed grid coordinate system.

Referring initially to FIG. 1, a laser beam receiver in accordance with the present invention is shown and generally designated 10. As shown, the laser beam receiver 10 includes a base 12 on which is mounted a detector 14. For purposes of the present invention the detector 14 preferably includes an avalanche photo diode (APD) of a type well known in the pertinent art. A surface 16 of the detector 14 is formed with an aperture which exposes the active area 18 of the APD. As best seen in FIG. 2A, the aperture for the active area 18 is substantially circular and has a diameter 20 which is approximately one hundred and fifty microns (150 $\mu$m).

Also included in the laser beam receiver 10 is an optical element 22 which acts as a focusing lens. As shown, the optical element 22 is mounted on an adjustment mechanism 24 which can be used to move the optical element 22, and thereby focus the light passing through the optical element 22 onto the surface 16 of the detector 14. Between the optical element 22 and the surface 16 of detector 14 is a light source 26. Preferably, the light source 26 is a light emitting diode (LED) which can be selectively activated by the operator during the set-up of the laser beam receiver 10 to illuminate both the surface 16 and the active area 18 of the detector 14. Further, as desired, light source 26 can be removed from the optical path when not required for use.

The laser beam receiver 10 also includes a beam splitter 28 which is positioned on the base 12 substantially as shown, and which is capable of reflecting approximately four percent (4%) of the light that is incident thereon. Additionally, there is a turning mirror 30 which directs light from the beam splitter 28 toward a camera 32. For the present invention, the camera 32 is a charge-coupled device (CCD) which incorporates an array of pixels that are oriented to establish a grid coordinate system 34. The grid system 34 is substantially planar and is scaled to give indications for movement in both the x and y directions. A representation of the grid system 34 is shown in FIG. 2A and is superposed on an image of the surface 16 and active area 18.

OPERATION

In order to set up the laser beam receiver 10 for its intended operation, several actions must be taken. One such action requires that the location of the active area 18 be properly identified. This is done by first activating the light source (LED) 26 to illuminate the surface 16 of detector 14. Light which is then scattered from the surface 16 is sent toward the beam splitter 28 where approximately 4% of it is directed through lens 29 toward turning mirror 30 and eventually to the camera 32. The resultant image of the surface 16 which is received at the camera 32 is shown in FIG. 2A. Also, in FIG. 2A it will be seen that the x-y grid coordinate system 34 established by the camera 32 is superposed on this image. For the present invention, the grid system 34 can be established in several ways. One such way is to incorporate a reference system which gives each pixel in the CCD camera 32 a different identifying address. These addresses correspond to distances from an origin in the x and y directions. For purposes of discussion, consider the grid system 34 to be superposed and established relative to the image of surface 16 with the center of the active area 18 located at the origin of the coordinate system 34 where grid line 34' (x=0) crosses the grid line 34" (y=0).

Another task which needs to be accomplished in the set-up of the laser beam receiver 10 is to orient the receiver 10 so that the in-coming laser beam 36, which is being sent to the receiver 10 on the communications link from a remote transmitter (not shown), can be focused onto the surface 16 of detector 14 by the optical element 22. Initially, the exact location of the focal point 38 of laser beam 36 on surface 16 is not predictable. This unpredictability must be accounted for as the object in setting up the laser beam receiver 10 is, of course, to have the focal point 38 coincident with the active area 18. To do this in accordance with the present invention, it is necessary to find the location of the focal point 38 in the grid coordinate system 34.

Figure 2B:
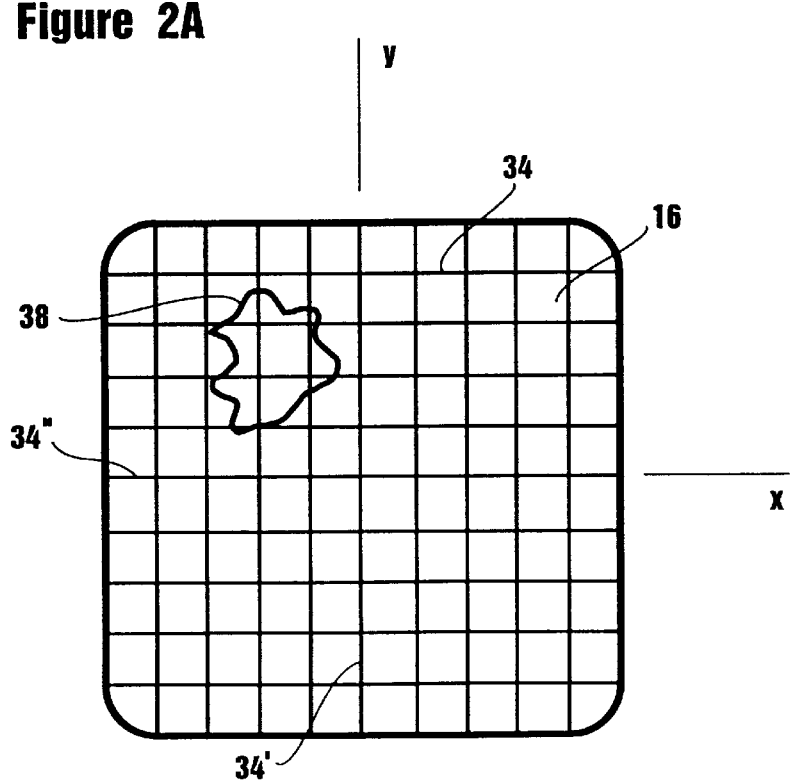
FIG. 2B is an image of the laser beam focal point as it is incident on the surface of the detector, with the same superposed grid coordinate system as shown in FIG. 2A.

As light is scattered from the focal point 38 on surface 16, it travels toward the beam splitter 28 where approximately 4% of the light is reflected through lens 29 toward the turning mirror 30. In turn, the light is reflected from turning mirror 30 toward the camera 32. The resultant reflection received by the camera 32 is shown in FIG. 2B. There it will be seen that the location of the center of the focal point 38 is at approximately x=−1.75 and y=+2.5. With the information shown in FIG. 2A for the location of active area 18 and the information shown in FIG. 2B for the location of the laser beam focal point 38, the operator is able to appropriately move optical element 22 in a manner which will bring the focal point 38 into coincidence with the active area 18. As intended for the present invention, this adjustment is a one-time action which will internally align the laser beam receiver 10 so that it is able to optionally detect the data information being carried on the in-coming laser beam 36. In subsequent operation, the position of the laser beam image 38 detected on camera 32 is used to maintain the external alignment of laser beam receiver 10 relative to the incoming laser beam 36 using external adjustments.

For an alternate embodiment of the laser beam receiver 10 of the present invention, which is adaptable for use with an optical system 40 such as a reflector telescope, reference is made to FIG. 3. The particular configuration for the optical system 40 shown in FIG. 3 is rather typical of a reflector telescope which includes cooperating reflectors 42 and 44. Specifically, the larger base reflector 42 is a mirror which directs light from an in-coming beam 46 toward the smaller central reflector 44. The central reflector 44 is likewise a mirror which redirects the beam 46 along its optical path. As can be appreciated from FIG. 3, the result of this configuration is a beam 46' which is concentrated to have a much smaller cross sectional area than the initial in-coming beam 46. Another consequence of this configuration is that the position of the reflector 44 in the path of the in-coming light beam 46 causes the reflector 44 to block or obscure a portion of the beam 46. This results in the creation of an obscuration or hole 48 in the light beam 46'. While FIG. 4 shows the hole 48 to be coaxial with the light beam 46', it is to be understood that in some instances the hole 48 may be somewhat eccentric and may not necessarily be round. Regardless of its exact position in the beam 46', the hole 48 is useful for aligning the laser beam 46 with the active area (aperture) 18 on the surface 16 of the detector 14. As a footnote, it is to be understood that for most applications contemplated by the present invention, the light in both beam 46 and 46' will be laser light and will be collimated. This, however, is not a specific requirement for the present invention. Also, it is to be understood that the telescope need not use mirror 42 and 44, but instead, could use lenses (not shown).

As the beam 46' leaves the optical system 40, it passes through an interference filter 50 which more precisely defines the band of wavelengths in the beam 46'. The beam 46' is then focused by a lens 52 to a focal point 38 on the surface 16 of detector 14. More accurately, the beam 46' is focused to a spot (e.g. point 38) which may actually cover a significant area which may be almost as much as half of the surface 16. After being focused onto the focal point 38, (spot) some of the light in beam 46' will be reflected or scattered from the surface 16. It then happens that a portion of this scattered light 54 will be directed back through the hole (obscuration) 48 and collected by the lens 52 for confinement within the hole 48. In most applications, as indicated above, this scattered light 54 which has been collected by the lens 52 will be substantially collimated.

After being collected by the lens 52, the scattered light 54 is focused by a lens 56 through a prism 58, and toward the camera 32. Specifically, after the scattered light 54 is focused by the lens 56, the prism 58 turns the scattered light 54 into a direction that is off-axis and, thus, away from the beam 46'. Preferably, in order to provide for a compact and efficient assembly for the receiver 10, both the lens 56 and the prism 58 can be mounted directly on the interference filter 50 substantially as shown in FIG. 3. Further, it is to be appreciated that the combination of interference filter, 50, lens 56 and prism 58 can all be moved relative to the camera 32 in order to allow for the proper focusing of the scattered light 54 onto the camera 32. In all other important respects, the operation of the alternate embodiment for the present invention is substantially the same or identical to the operations disclosed above for other embodiments of the present invention. While the particular system for directing a laser beam toward an active area as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for aligning a light beam with a detector which comprises:

means for defining a beam of light, the beam having an optical axis and a cross section in a plane perpendicular to the axis, the cross section having a hole therein for at least a portion of the beam;

means for focusing the beam to a spot on said detector;

means for collecting light scattered into the hole of the beam from the spot on the detector;

means for directing the collected light off-axis; and a camera positioned at a distance from the axis of the beam for receiving the off-axis light from said directing means to determine a location for the spot on said detector.

2. A device as recited in claim 1 further comprising:

a grid oriented on said detector for determining the location of the spot relative to said grid; and means for adjusting said focusing means relative to said detector to maintain the spot at a predetermined location on said grid.

3. A device as recited in claim 1 further comprising an interference filter positioned between said generating means and said detector for confining the beam of collimated light to a band of wavelengths.

4. A device as recited in claim 3 wherein said band is a range of wavelengths between approximately 775 nm and 795 nm (785 nm±10 nm).

5. A device as recited in claim 3 wherein said directing means is mounted on said interference filter.

6. A device as recited in claim 1 wherein said focusing means is a first lens.

7. A device as recited in claim 6 wherein said collecting means is said first lens.

8. A device as recited in claim 1 wherein said directing means includes a prism to establish an off-axis path for the collected light.

9. A device as recited in claim 8 wherein said directing means further includes a second lens for focusing the collected light along the path and onto said camera.

10. A device as recited in claim 9 wherein the path of the collected light is substantially perpendicular to the axis of the laser beam.

11. A device as recited in claim 1 wherein said generating means is a telescope.

12. A method for aligning a light beam with a detector in a device which comprises the steps of:

defining a beam of light, the beam having an optical axis and a cross section in a plane perpendicular to the axis, the cross section having a hole for at least a portion of the beam;

focusing the beam with a focusing means to a spot on the detector;

collecting light scattered into the hole of the beam from the spot on the detector;

directing the collected light off-axis; and receiving the off-axis light to determine a location for the spot on the detector.

13. A method as recited in claim 12 further comprising the steps of:

orienting a grid on the detector for determining the location of the spot relative to the grid; and adjusting the focusing means relative to the detector to maintain the spot at a predetermined location on the grid.

14. A method as recited in claim 13 further comprising the step of fixing the focusing means relative to the detector to maintain an internal alignment of the laser beam with the detector.

15. A method as recited in claim 14 further comprising the step of moving the device relative to the laser beam to maintain an external alignment of the laser beam with the detector.

16. A method as recited in claim 12 further comprising the step of positioning an interference filter on the axis of the beam to confine the beam of light to a band of wavelengths.

17. A method as recited in claim 16 wherein said band is a range of wavelengths between approximately 775 nm and 795 nm (785 nm±10 nm).

18. A method as recited in claim 12 wherein the light beam is collimated laser light.

19. A method as recited in claim 18 wherein the cross section of the beam surrounding the hole is formed as an annulus.

* * * * *